United States Patent [19]

Sykes

[11] Patent Number: 5,449,185
[45] Date of Patent: Sep. 12, 1995

[54] BABY WALKER WITH ANTI-TIP FEATURE

[76] Inventor: Jerrold Sykes, 1455 La Tour La. #20, Concord, Calif. 94521

[21] Appl. No.: 279,246
[22] Filed: Jul. 21, 1994
[51] Int. Cl.⁶ .................................................. B62B 9/10
[52] U.S. Cl. .................................. 280/87.051; 280/755
[58] Field of Search ........... 280/87.01, 87.021, 87.051, 280/755; 135/67; 188/5

[56] References Cited

U.S. PATENT DOCUMENTS

| D. 204,252 | 4/1966 | Hubel | D12/130 |
|---|---|---|---|
| D. 301,440 | 6/1989 | Conley | D12/130 |
| D. 305,750 | 1/1990 | Cone | D12/130 |
| 568,126 | 9/1900 | Settlemyre | 280/87.051 |
| 1,321,564 | 11/1919 | Smith | 280/87.051 |
| 1,492,202 | 4/1924 | Carroll | 280/87.051 |
| 1,609,797 | 12/1926 | Chun Fat | 280/755 |
| 2,765,839 | 10/1956 | Arpin | 280/87.051 |
| 4,015,853 | 4/1977 | Summers | 280/87.051 |
| 4,019,756 | 4/1977 | Ishida | 280/87.051 |
| 4,699,392 | 10/1987 | Ku | 280/87.051 |
| 4,799,700 | 1/1989 | Knoedler et al. | 280/87.051 |
| 4,822,030 | 4/1989 | Cone | 280/87.051 |
| 4,844,209 | 7/1989 | Sedlack | 280/87.051 |
| 4,946,158 | 8/1990 | Olayan et al. | 280/755 X |
| 4,988,138 | 1/1991 | Danna et al. | 280/87.051 |

Primary Examiner—Margaret A. Focarino
Assistant Examiner—Michael Mar
Attorney, Agent, or Firm—Thomas R. Lampe

[57] ABSTRACT

Baby walker apparatus includes a framework and a rigid anti-tip member fixedly secured to the bottom of the framework. The rigid anti-tip member includes a ring element having a rounded outer peripheral surface and a plurality of stabilizer elements spaced from one another and radiating outwardly from the ring element beyond the rounded outer peripheral surface. The distal ends of at least two of the stabilizer elements are in simultaneous engagement with the floor upon tipping of the framework in any direction to limit the extent of the tipping and to stabilize the baby walker apparatus against rotational movement.

4 Claims, 4 Drawing Sheets

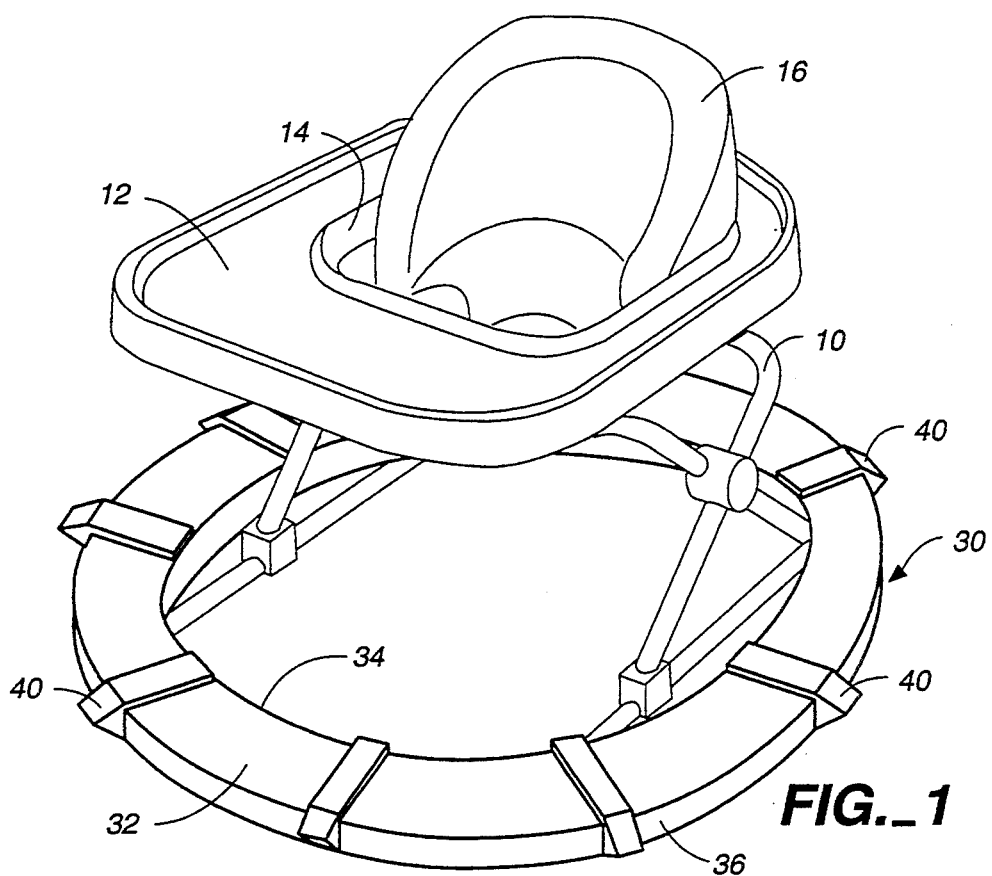
FIG._1
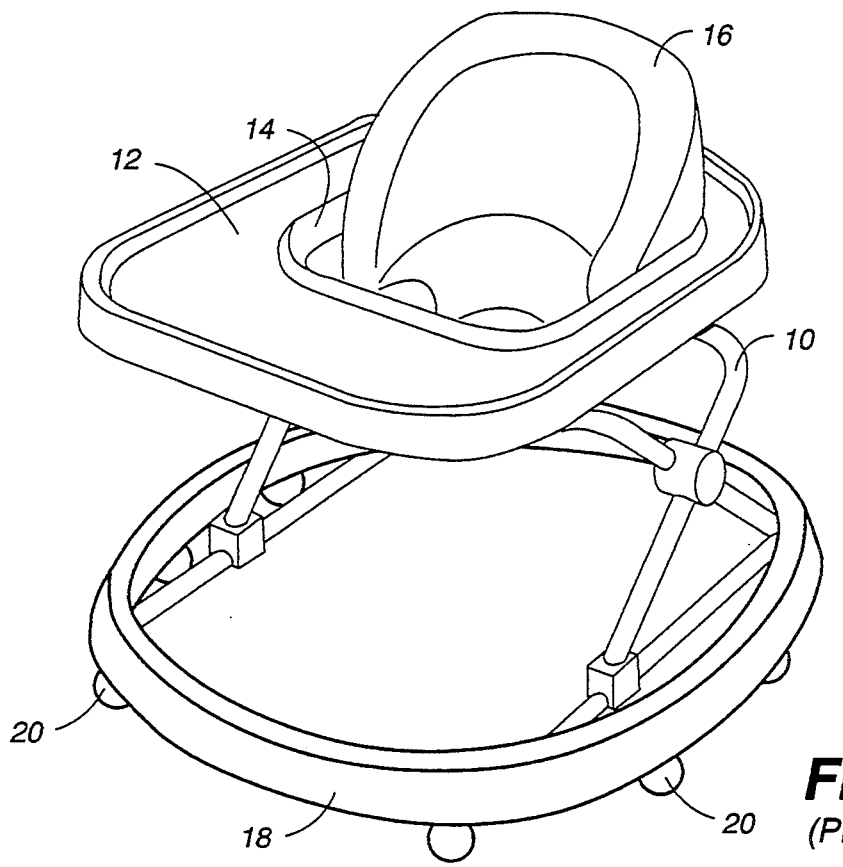
FIG._1A
(PRIOR ART)

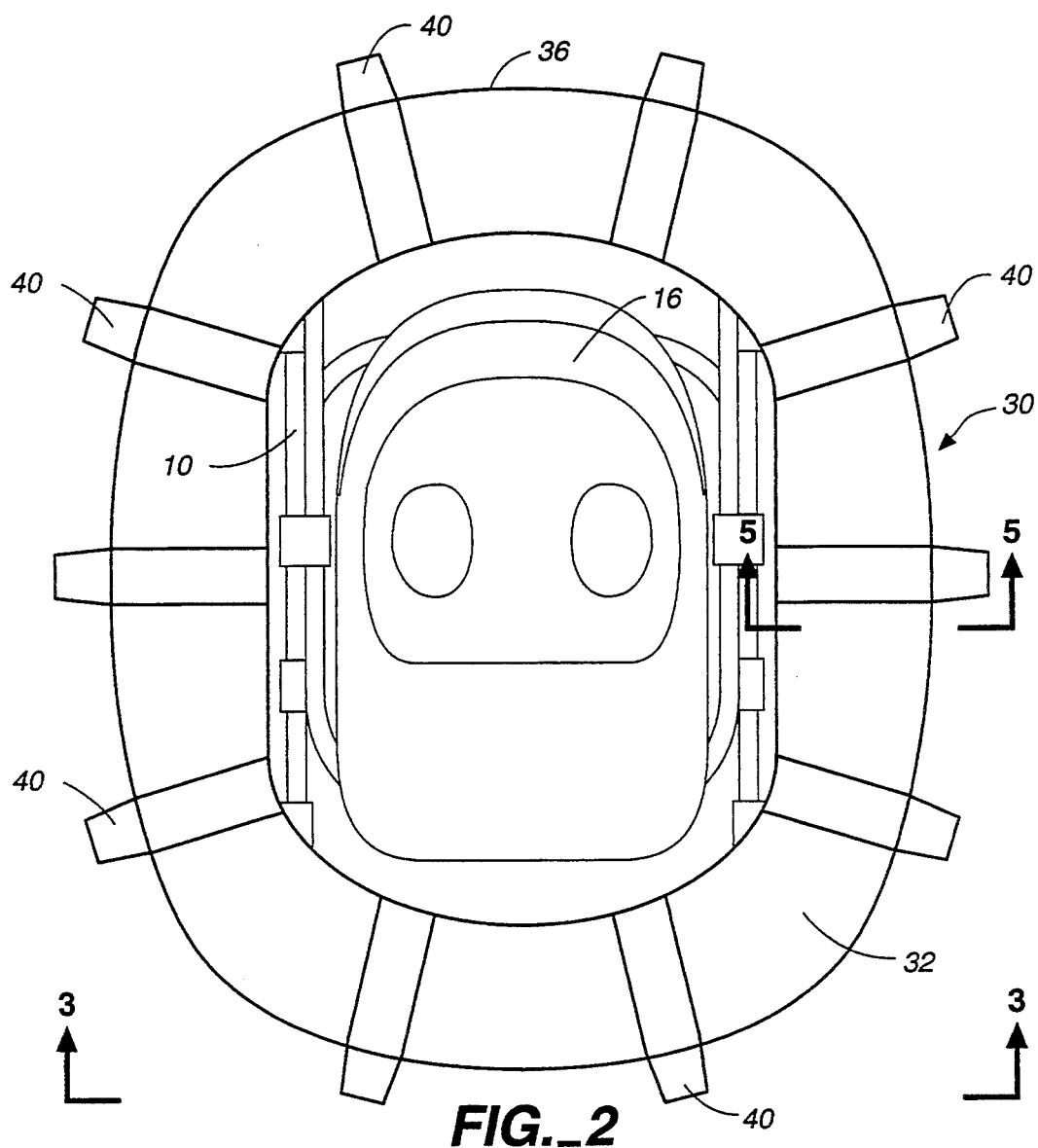
FIG._2
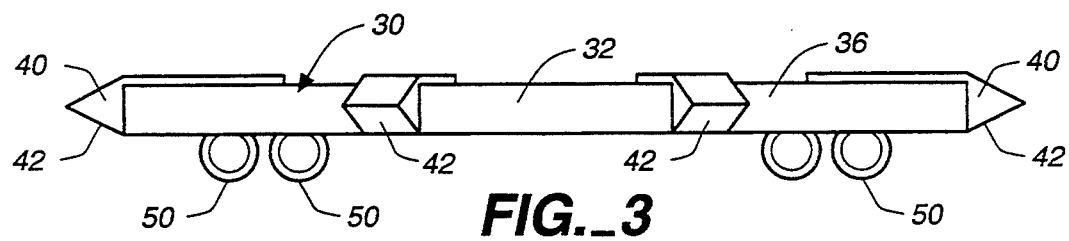
FIG._3

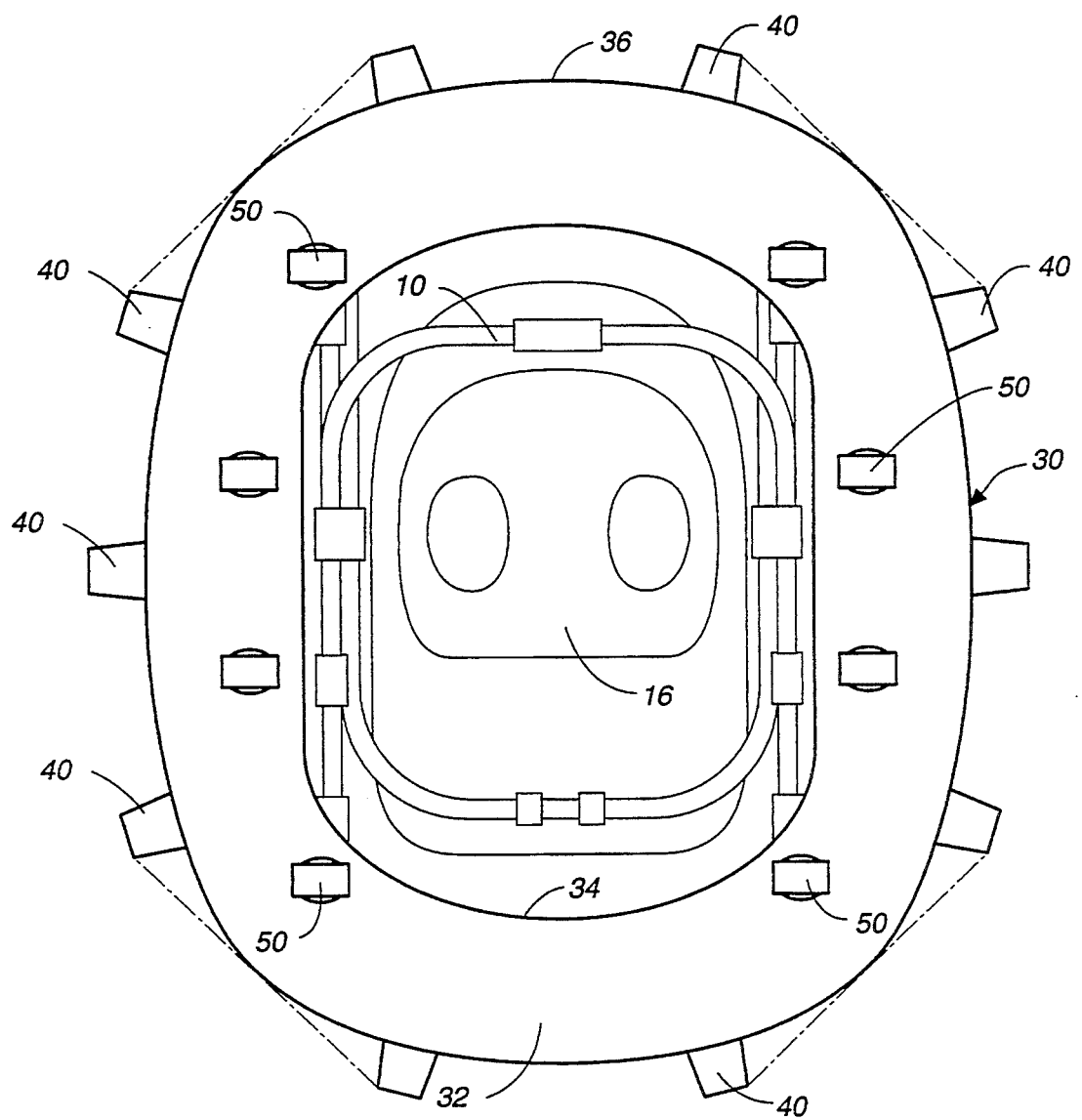
FIG._4

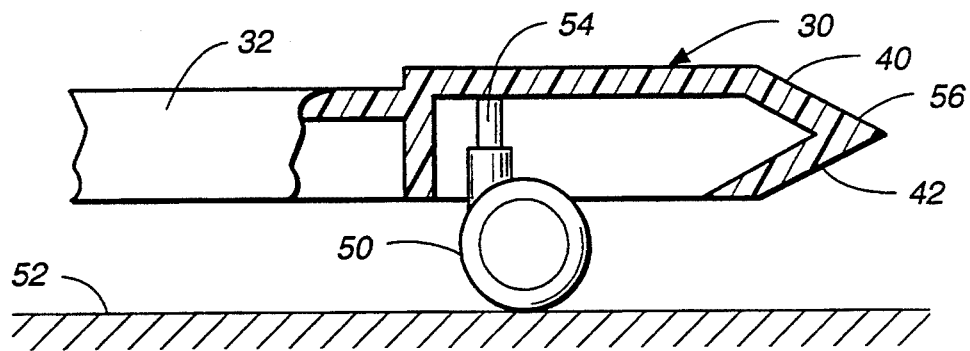
FIG._5
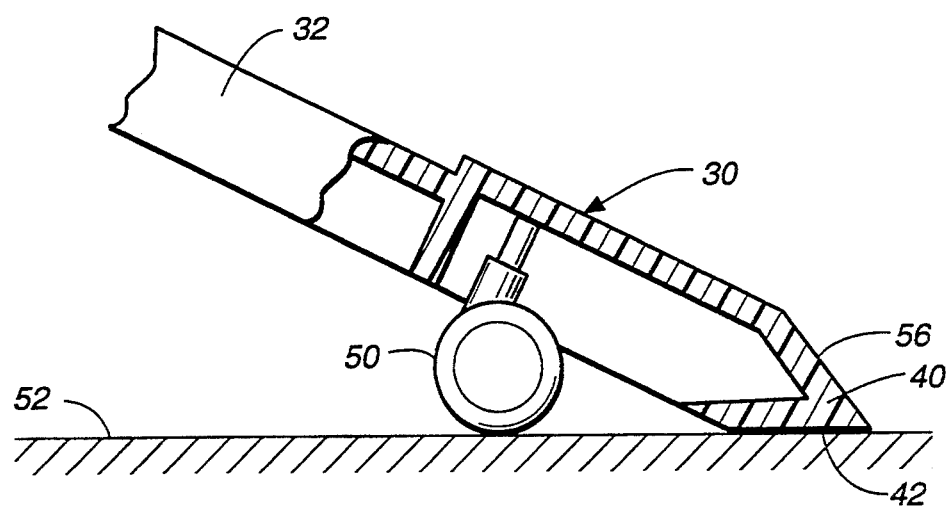
FIG._6

BABY WALKER WITH ANTI-TIP FEATURE

TECHNICAL FIELD

This invention relates to baby walkers, more particularly, to a baby walker apparatus which limits tipping of the walker and stabilizes the walker.

BACKGROUND ART

Baby walkers are well known devices for providing support to a child while allowing the child to ambulate either indoors or outdoors- Baby walkers are, for example, disclosed in U.S. Pat. No. 2,765,839, issued Oct. 9, 1956, U.S. Pat. No. 4,015,853, issued Apr. 5, 1977, U.S. Pat. No. 4,988,138, issued Jan. 29, 1991, U.S. Pat. No. 4,019,756, issued Apr. 26, 1977, U.S. Pat. No. 4,844,209, issued Jul. 4, 1989, U.S. Pat. No. 4,699,392, issued Oct. 13, 1987, U.S. Pat. No. 4,799,700, issued Jan. 24, 1989, U.S. Pat. No. 4,822,030, issued Apr. 18, 1989, U.S. Pat. No. 658,126, issued Sep. 18, 1900, U.S. Pat. No. Des. 204,252, issued Apr. 5, 1966, U.S. Pat. No. Des. 301,440, issued Jun. 6, 1989, and U.S. Pat. No. Des. 305,750, issued Jan. 30, 1990.

The present invention relates to baby walker apparatus with an anti-tipping feature. That is, the baby walker is so constructed as to limit the degree of tipping thereof to prevent possible harm or injury to the child using the device. The apparatus also is constructed in such a manner as to resist rotation of the walker on the floor after a minimal amount of tipping has taken place. That is, the baby walker apparatus of the present invention will not tip to such a degree that the child can fall or can no longer be supported by the baby walker. Further, the baby walker apparatus contacts the floor in a manner which will stabilize the apparatus when the small amount of tipping allowed by the structure thereof has occurred.

The device of U.S. Pat. No. 4,015,853 relates to an enclosure to be attached to a conventional baby walker which extends over and surrounds the child to prevent the child from reaching objects. The device will not prevent tipping over of the baby walker.

U.S. Pat. No. 4,988,138 discloses a detachable bumper guard provided for use with a baby walker. The bumper guard comprises a longitudinal cushioning main body sufficient in length to substantially encircle the parametrical surface of the walker and a slot to receive at least a portion of the surface. A mechanism is provided for releasably attaching the main body to the lower circular base of the walker.

U.S. Pat. No. 2,765,839 discloses a baby walker which utilizes a ring having a wheel rotatably disposed about a portion thereof. The wheel engages the floor when the walker is tipped slightly to prevent further tipping. Such an arrangement will not stop or stabilize the baby walker against movement relative to the floor after the wheel on the ring engages the floor. The baby walker can rotate about the vertical axis of the walker on the ring, thus creating an unstable situation.

U.S. Pat. No. 658,126 shows a baby walker with downwardly extending, curved fenders which engage the floor when the walker tips. This arrangement suffers from the same deficiency outlined above with respect to U.S. Pat. No. 2,765,839.

DISCLOSURE OF INVENTION

The present invention relates to a baby walker apparatus including a framework having a lower end, the framework providing support for a baby utilizing the baby walker apparatus and defining an opening for occupancy by a baby.

A rigid anti-tip member is rigidly secured to the framework bottom, surrounding the framework, and radiating outwardly from the framework.

The rigid anti-tip member includes a ring element defining a central opening and having a rounded outer peripheral surface and a plurality of stabilizer elements spaced from one another and radiating outwardly from the ring element. Each of the stabilizer elements has a distal end.

A plurality of wheels is connected to the rigid anti-tip member and extends downwardly from the rigid anti-tip member at spaced locations thereon inwardly of the rounded outer peripheral surface to support the framework above a floor.

The distal ends of at least two of the stabilizer elements of the rigid anti-tip member are in simultaneous engagement with the floor upon tipping of the framework in any direction to limit the extent of tipping and to stabilize the baby walker against rotational movement.

The stabilizer elements are projections having bottom planar surfaces obliquely disposed relative to and above a floor when the baby walker is not tipped and which are generally parallel to the floor when the baby walker is tipped and the bottom planar surfaces are in engagement with the floor.

Other features, advantages, and objects of the present invention will become apparent with reference to the following description and accompanying drawings.

BRIEF DESCRIPTION OF DRAWINGS

FIG. 1 is a frontal perspective view illustrating baby walker apparatus constructed in accordance with the teachings of the present invention;

FIG. 1A is a view similar to FIG. 1 but illustrating a conventional prior art baby walker;

FIG. 2 is an enlarged plan view of the apparatus of FIG. 1;

FIG. 3 is a frontal view taken in the direction of arrows 3—3, illustrating the rigid anti-tip member of the present invention and associated wheels;

FIG. 4 is a bottom view of the baby walker apparatus of the present invention;

FIG. 5 is an enlarged sectional view taken along the line 5—5 in FIG. 2 illustrating the condition of a stabilizer element and related structure when the baby walker is not tipped; and FIG. 6 is a view similar to FIG. 5 but illustrating the positions assumed by a projection and related structure when the baby walker is tipped.

BEST MODE FOR CARRYING OUT THE INVENTION

Referring now to the drawings, baby walker apparatus constructed in accordance with the teachings of the present invention is disclosed in FIGS. 1 and 2–6. The apparatus includes a framework 10 with a counter or platform 12 having an opening 14 for occupancy by a baby (not shown). Also, as is conventional, a seat 16 is disposed in the opening.

The structure just described is, as stated, conventional, and FIG. 1A shows such structure incorporated in a typical prior art baby walker arrangement. In the prior art approach, a relatively narrow ring 18 is disposed about the frame 10 and has wheels or casters 20 projecting downwardly therefrom relatively close to the outer peripheral surface of the ring. Employing this prior art arrangement, a baby could relatively easily tip the baby walker apparatus over with potentially harmful results.

In contrast to the prior art approach, the apparatus constructed in accordance with the teachings of the present invention has a rigid anti-tip member 30 rigidly secured to the framework.

Rigid anti-tip member 30 includes a ring element 32 defining a central opening 34 and having a rounded outer peripheral surface 36. In the arrangement illustrated, ring element 32 is generally oval-shaped.

Member 30 also includes a plurality of stabilizer elements in the form of projections 40 spaced from one another and radiating outwardly from the ring element beyond the rounded outer peripheral surface thereof.

Each projection has a distal end with a bottom planar surface 42. In the illustrated preferred embodiment, rigid anti-tip member 30 is of integral, molded plastic construction. The framework 10 of the baby walker apparatus is embedded in or otherwise rigidly secured to ring element 32.

A plurality of wheels 50 are connected to the rigid anti-tip member and extend downwardly therefrom at spaced locations thereon inwardly of the rounded outer peripheral surface 36 to support the framework 10 above a floor 52 (FIGS. 5 and 6). The wheels 50 are positioned at locations between adjacent projections. Any suitable swivel mount may be utilized to mount the wheels and the term "wheels" as employed herein refers to any rotatable support element such as ball-type casters.

FIG. 5 shows the condition of a projection 40 when the baby walker apparatus is not tipped. In such condition, the bottom planar surface 42 thereof is obliquely disposed relative to and above floor 52, extending upwardly as it proceeds from ring element 32. When, however, the baby walker apparatus begins to tip, tipping of a relatively small extent or degree will bring the bottom planar surface generally parallel to the floor and in engagement with the floor. This will terminate further tipping of the baby walker apparatus. Each projection also has an upper planar surface 56 which converges with the bottom planar surface 42 at the distal ends of the projection. This configuration also cooperates in helping to prevent further movement of the baby walker apparatus in the direction of the tip by engaging the floor. This is particularly true when the floor is a carpet.

The projections 40 are so spaced about the ring element 32 that two of the projection distal ends will be simultaneously in engagement with the floor upon tipping of the framework in any direction to limit the extent of the tipping. Such action also stabilizes the baby walker apparatus against rotational movement. It will be appreciated that without the projections, engagement of the floor by the ring only could easily result in rotation of the baby walker apparatus while the ring element is in contact with the floor, causing possible harm to the child in the baby walker apparatus.

FIG. 4 shows an imaginary line drawn between adjacent projections 40 located on either side of rounded corners of the ring element 32. It will be noted that the rounded outer peripheral surface at the corners contacts the imaginary line. Tipping of the framework in the directions of these corners will therefore result in simultaneous three point or tripod-like contact of the rigid anti-tip member with the floor to provide even greater stability.

I claim:

1. Baby walker apparatus comprising, in combination:
   a framework having a lower end, said framework providing support for a baby utilizing the baby walker apparatus and defining an opening for occupancy by the baby;
   a rigid anti-tip member rigidly secured to the framework bottom, surrounding the framework, and radiating outwardly from said framework, said rigid anti-tip member including a ring element defining a central opening and having a rounded outer peripheral surface and a plurality of stabilizer elements spaced from one another along the peripheral surface and radiating outwardly from said ring element beyond said rounded outer peripheral surface, each said stabilizer element being a projection having a bottom planar surface obliquely disposed relative to a lower surface of the ring element and an upper planar surface which converges with said bottom planar surface in a direction away from said outer peripheral surface to intersect at a distal end of the projection; and
   a plurality of wheels connected to the lower surface of said ring element and extending downwardly from said ring element at spaced locations thereon inwardly of said rounded outer peripheral surface to support said framework above a floor, the bottom planar surfaces of the projections being disposed obliquely relative to the floor when the baby walker apparatus is in a non-tipped position and the bottom planar surfaces of at least two of the projections simultaneously being parallel to and in engagement with the floor upon tipping of the framework in any direction to limit the extent of said tipping and to stabilize said baby walker apparatus against rotational movement.

2. The baby walker apparatus according to claim 1 wherein said rigid anti-tip member is of integral, molded plastic construction.

3. The baby walker apparatus according to claim 1 wherein the rounded outer peripheral surface contacts an imaginary line drawn between adjacent distal ends of at least some of said stabilizer elements whereby tipping of said framework in at least some directions will result in simultaneous three point engagement of the rigid anti-tip member with the floor.

4. The baby walker apparatus according to claim 1 wherein said wheels are positioned at locations between adjacent stabilizer elements.

* * * * *